W. R. Dunn.
Vegetable Cutter.
N° 102,666.   Patented May 3, 1870.

Witnesses
R. J. Williams
Nelon Williams

Inventor
William R. Dunn

United States Patent Office.

WILLIAM R. DUNN, OF ALTON, INDIANA.

Letters Patent No. 102,666, dated May, 3, 1870.

IMPROVEMENT IN MACHINE FOR CUTTING VEGETABLES.

The Schedule referred to in these Letters Patent and making part of the same

Be it known that I, WILLIAM R. DUNN, of the town of Alton, county of Crawford and the State of Indiana, have invented a new and useful Machine for Cutting Cabbage and other Vegetables, for Crout, &c.; and I do hereby declare that the following is a full, clear, and exact description of the construction and operation of the same, reference being had to the annexed drawings making a part of this specification, in which—

Figure 1:
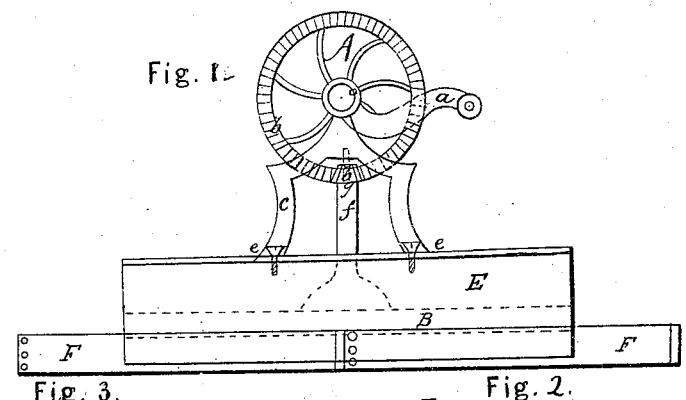
Figure 3:
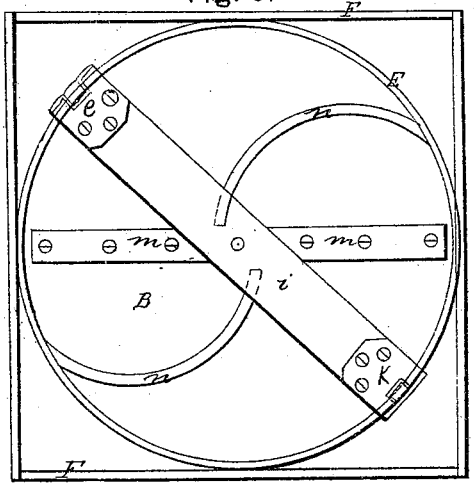
Figure 2:
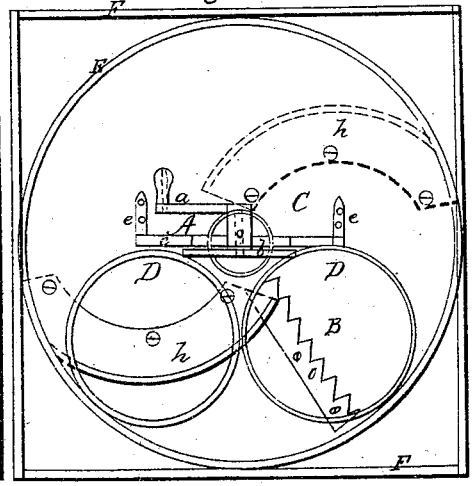
Figure 4:
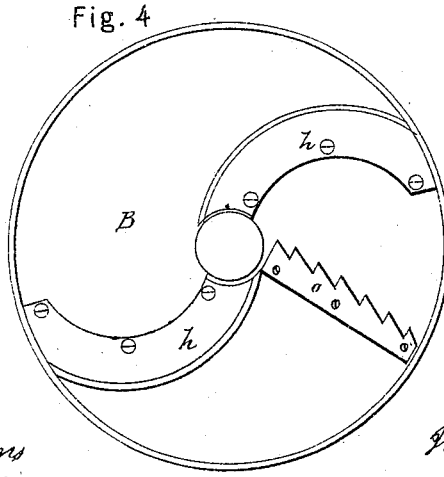

Figure 1 is a side elevation of my improved device;
Figure 2 is a top plan view;
Figure 3 is a bottom plan view; and
Figure 4 is a top view of the rotary wheel.

This invention relates to an improved crout-cutting machine; and

It consists in certain peculiarities of construction and operation as will be hereinafter specifically designated and set forth in the following specification and claim.

Similar letters of reference indicate identical parts in each of the figures.

In the annexed drawings, forming a part of this specification—

A is the gearing of the drive-wheel, having a gear-wheel, $b$, driven by a crank $a$, the said gear-wheel meshing with the pinion $b$ upon the vertical shaft $f$, which is driven by the driving parts just explained.

This driving-gear is supported upon the bridge C, suitably secured to the casing E.

The wheel B, carrying the knives $h\ h$, and cutter $o$, is supported upon the adjustable cross-bar $i$, for the purpose of enabling it to be removed and cleaned, and is rotated by the driving-shaft $f$.

N N represent the throats below the knives, through which the shavings pass.

The box or casing E is round, to correspond with the circular wheel B, and has a top, C, provided with two hoppers D D, passing through and extending to the knives.

The casing E is surrounded by a square box, F, to enlarge its base.

The operation is simple, and may be stated as follows:

The machine is placed over a suitable box or vessel, which acts as a receptacle for the cuttings when the machine is fed through the hopper D D, which discharges its cuttings through the throats N N as fast as cut.

For cutting crout short, attach the upright knives $o$. For cutting it long, omit them.

Having thus described my invention,

What I claim and desire to secure by Letters Patent of the United States, is—

The combination with the casing E, provided with one or more vertical hoppers D D, of the shaft $f$, wheel B, knives $h\ h\ o$, and the adjustable bar $i$, all being arranged to operate together, substantially in the manner herein shown and described, and for the purpose set forth.

WILLIAM R. DUNN.

Witnesses:
R. T. WILLIAMS,
NELSON WILLIAMS.